(12) United States Patent
Torchio et al.

(10) Patent No.: US 8,815,353 B2
(45) Date of Patent: Aug. 26, 2014

(54) WIRELESS HOSE ARTICLE AND RELATED METHODS

(75) Inventors: Bruno Ranieri Torchio, Sao Paulo (BR); Antonio Rodrigues Da Silva, Sao Paulo (BR)

(73) Assignee: Veyance Technologies, Inc., Fairlawn, OH (US)

( * ) Notice: Subject to any disclaimer, the term of this patent is extended or adjusted under 35 U.S.C. 154(b) by 1445 days.

(21) Appl. No.: 11/928,470

(22) Filed: Oct. 30, 2007

(65) Prior Publication Data

US 2009/0110860 A1 Apr. 30, 2009

(51) Int. Cl.
*F16L 11/00* (2006.01)

(52) U.S. Cl.
USPC .......... 428/35.7; 156/428; 156/123; 138/121; 138/132

(58) Field of Classification Search
USPC ................. 138/118, 111, 121, 119; 428/35.7; 156/428
See application file for complete search history.

(56) References Cited

U.S. PATENT DOCUMENTS

| | | | |
|---|---|---|---|
| 3,613,736 A | 10/1971 | Kuwabara | |
| 3,682,202 A | 8/1972 | Buhrmann et al. | |
| 3,779,308 A | 12/1973 | Buhrmann et al. | |
| 3,787,956 A | 1/1974 | Miller | |
| 4,019,939 A | 4/1977 | Barbier et al. | |
| 4,020,719 A | 5/1977 | Houck et al. | |
| 4,108,701 A | 8/1978 | Stanley | |
| 4,123,088 A | 10/1978 | Tanaka | |
| 4,147,101 A | 4/1979 | Heissenberger et al. | 100/118 |
| 4,154,266 A | 5/1979 | Tanaka et al. | |
| 4,168,198 A | 9/1979 | Stanley | |
| 4,182,019 A | 1/1980 | Tally et al. | |
| 4,366,842 A | 1/1983 | Peavy et al. | |
| 4,446,198 A | 5/1984 | Shemenski et al. | |
| 4,545,834 A | 10/1985 | Shemenski et al. | |
| 4,553,568 A * | 11/1985 | Piccoli et al. | 138/125 |
| 4,585,035 A | 4/1986 | Piccoli | |
| 4,668,319 A | 5/1987 | Piccolo | |
| 4,738,816 A | 4/1988 | Anderson | |
| 5,090,744 A * | 2/1992 | Hagiwara et al. | 285/281 |
| 5,391,334 A | 2/1995 | Enomoto | |
| 5,453,229 A | 9/1995 | Enomoto | |
| 5,634,497 A | 6/1997 | Neto | |
| 5,698,278 A | 12/1997 | Emond et al. | |
| 6,701,968 B2 * | 3/2004 | Bolonhezi | 138/132 |
| 6,926,038 B1 * | 8/2005 | Cook et al. | 138/127 |
| 7,080,858 B2 | 7/2006 | Sanches et al. | |
| 7,132,481 B2 | 11/2006 | Burkholder et al. | |

FOREIGN PATENT DOCUMENTS

FR 2264231 A1 3/1974
WO WO 03/089829 10/2003

* cited by examiner

*Primary Examiner* — Ellen S Raudenbush
(74) *Attorney, Agent, or Firm* — Alvin T. Rockhill

(57) ABSTRACT

The present invention generally relates to wireless flexible hose articles and methods. Some embodiments include low-mass hoses. Furthermore, some embodiments can comprise methods for making and/or using such hose articles.

11 Claims, 2 Drawing Sheets

WIRELESS HOSE ARTICLE AND RELATED METHODS

BACKGROUND OF THE INVENTION

A. Field of Invention

The present invention generally relates to wireless flexible hose articles and methods. Some embodiments relate to low-mass hoses. Some embodiments are related to methods for making and using such hoses.

B. Description of the Related Art

Wireless hose articles are known in the art. Prior art wireless hoses typically consist of one or more layers of polymer such as rubbers, thermoplastics and/or thermosets. Some prior art also includes one or more reinforcing layers, such as a braided fiber layer. However, the art is deficient in that it fails to include wireless hose articles having helical non-wire reinforcing members.

The present invention provides hoses having helical non-wire reinforcing members. The present invention also provides methods related to hose articles having helical non-wire reinforcing members.

SUMMARY OF THE INVENTION

Some embodiments of the present invention relate to a hose article, comprising: a core layer; a helical PVC layer over the core layer; an intermediate rubber reinforcing layer over the helical PVC layer; and a rubber cover layer over the intermediate rubber reinforcing layer.

Other embodiments relate to a process for making an article, comprising the steps of: extruding a core layer; extruding a helical PVC layer over the core layer; wrapping an intermediate rubber reinforcing layer over the helical PVC layer; and wrapping a rubber cover layer over the intermediate rubber reinforcing layer.

Still other embodiments relate to an hose article, comprising: an abrasion-resisting means, for resisting abrasion by flowing slurries; a flexible-reinforcing means for flexibly reinforcing the abrasion-resisting means; an additional reinforcing means for reinforcing the abrasion-resisting means; and a covering means, for covering the additional reinforcing means.

Other benefits and advantages will become apparent to those skilled in the art to which it pertains upon reading and understanding of the following detailed specification.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION OF THE INVENTION

Figure 1:
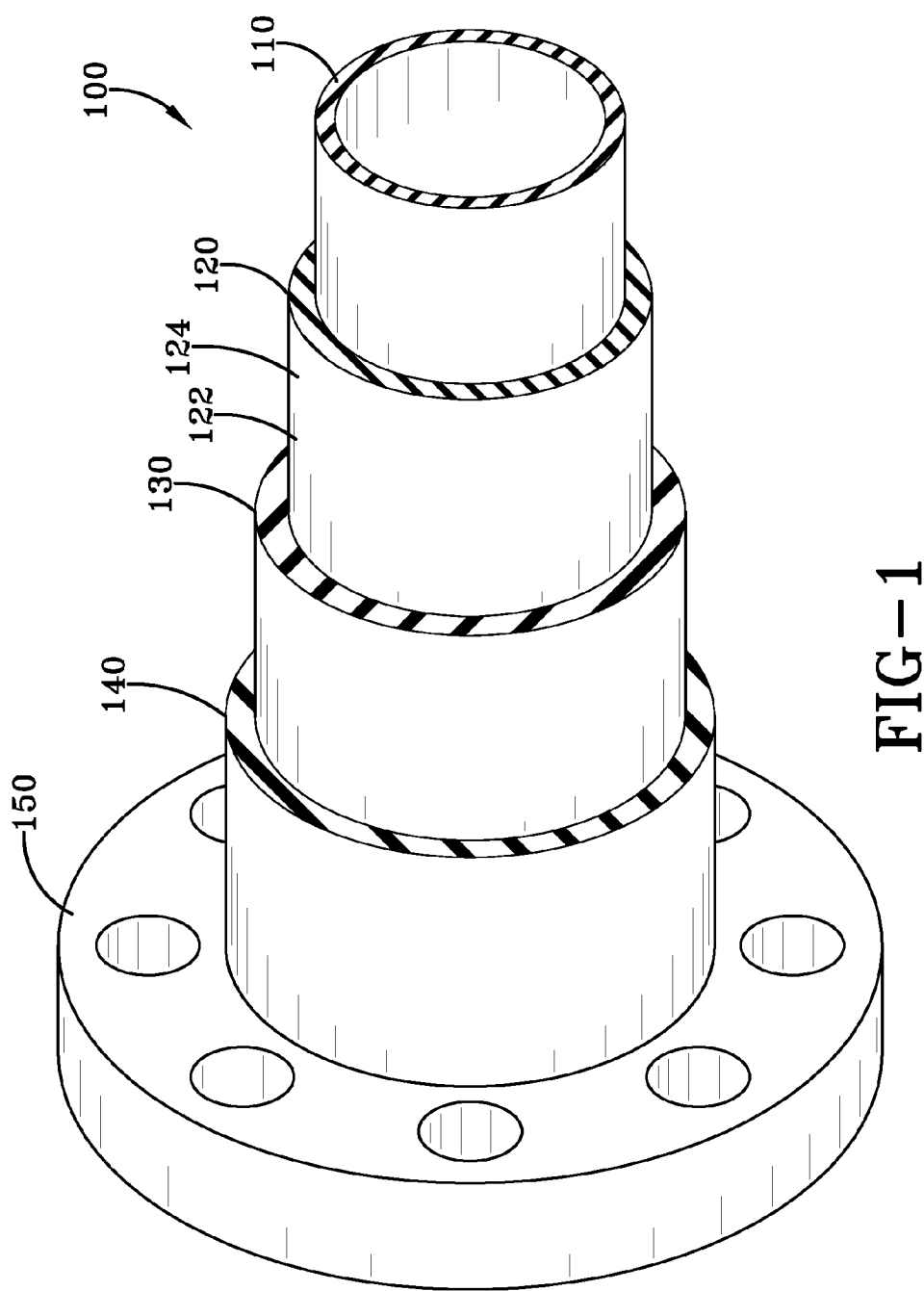
FIG. 1 is a cut-away drawing of an embodiment showing the various layers thereof, and including a flange member.

The present invention generally relates to wireless flexible hose articles and methods. Some embodiments include hoses that may be low in mass. Furthermore, some embodiments may comprise methods for making and/or using such hose articles.

According to some embodiments, a hose article comprises one or more non-metallic helical reinforcing members. Such embodiments also include at least an innermost core layer, an intermediate helical reinforcing layer, and an outermost top layer, together defining a hose wall thickness. For example, a typical hose wall can comprise a cylindrical structure defining a longitudinal axis, and having a first end and a second end, and having a continuous radial surface. The continuous radial surface includes at least one interior wall defining a space for containing fluid, and the interior wall connects the first end and the second end, thereby forming a hollow cylindrical structure having two open ends. Such containment spaces can be, for example, cylindrical in shape.

The hose article can have an internal diameter ranging from about 2 inches to about 12 inches. According to some embodiments, a hose article can have an internal diameter from about 2 inches to about 3 inches, from about 3 inches to about 4 inches, from about 4 inches to about 5 inches, from about 5 inches to about 6 inches, from about 6 inches to about 7 inches, from about 7 inches to about 8 inches, from about 8 inches to about 9 inches, from about 9 inches to about 10 inches, from about 10 inches to about 11 inches, or even from about 11 inches to about 12 inches. Here as elsewhere in the specification and claims, ranges may be combined.

In some embodiments, the core layer can comprise one or more organic polymers. Suitable core layers can comprise any of a variety of polymeric compositions including, without limitation, thermoplastic polyurethane, chlorosulfonated polyethylene, a chlorosulfonated polyethylene/chlorinated polyethylene blend, a hydrogenated nitrile rubber or a nitrile rubber, polychloroprene, chlorinated polyethylene acrylonitrile-butadiene, styrene butadiene, polyisoprene, polybutadiene, ethylene-propylene-diene terpolymers, chlorinated polyethylene, natural rubber polymers. Containment layers can also include thermoplastic elastomers such as, but not limited to, propylene modified with ethylene-propylene rubber (e.g. Santoprene®, available from Monsanto Corporation); block polymers, such as the Kraton® line of polymers available from Shell Chemical Company; polyvinyl chloride, and the like, or any combination thereof. These elastomers may be compounded with fillers, plasticizers, antioxidants, and cure systems to achieve particular properties desired for a given application, as known in the art.

A helical reinforcing layer can comprise a first helix and a second helix joined to, and continuous, with the first helix such that together the two helices form a continuous layer. The first helix can comprise a polymer that is relatively stiff in comparison to the second helix. The second helix can comprise a polymer that is relatively flexible in comparison to the first helix. A helical reinforcing layer can comprise any of a wide variety of polyvinyl chloride polymers having a wide range of degrees of polymerization, plasticizer levels, and/or stiffnesses. In one embodiment, the flexible helix is in a coaxial relation to the core layer and the rigid component defines a helix that joins the turns of the flexible component helix and forms a continuos PVC layer comprising a flexible helix and a rigid helix.

Some embodiments can include one or more additional intermediate layers. The additional intermediate layers can comprise helical structures, or can comprise other structures such as braided, wound or knitted fiber layers. In some embodiments, an additional intermediate layer can comprise an unstructured or isotropic elastomeric layer. In still other embodiments, the additional intermediate layers can comprise any combination of the foregoing layer types.

A top layer can comprise one or more organic polymers. Suitable core layers can comprise any of a variety of polymeric compositions including, without limitation, thermoplastic polyurethane, chlorosulfonated polyethylene, a chlorosulfonated polyethylene/chlorinated polyethylene blend, a hydrogenated nitrile rubber or a nitrile rubber, polychloroprene, chlorinated polyethylene acrylonitrile-butadiene, styrene butadiene, polyisoprene, polybutadiene, ethylene-propylene-diene terpolymers, chlorinated polyethylene, natural rubber polymers. Containment layers can also include thermoplastic elastomers such as, but not limited to, propylene modified with ethylene-propylene rubber (e.g. Santoprene®, available from Monsanto Corporation); block polymers, such as the Kraton® line of polymers available from Shell Chemical Company; polyvinyl chloride, and the like, or any combination thereof. These elastomers may be compounded with fillers, plasticizers, antioxidants, and cure systems to achieve particular properties desired for a given application, as known in the art.

Figure 2:
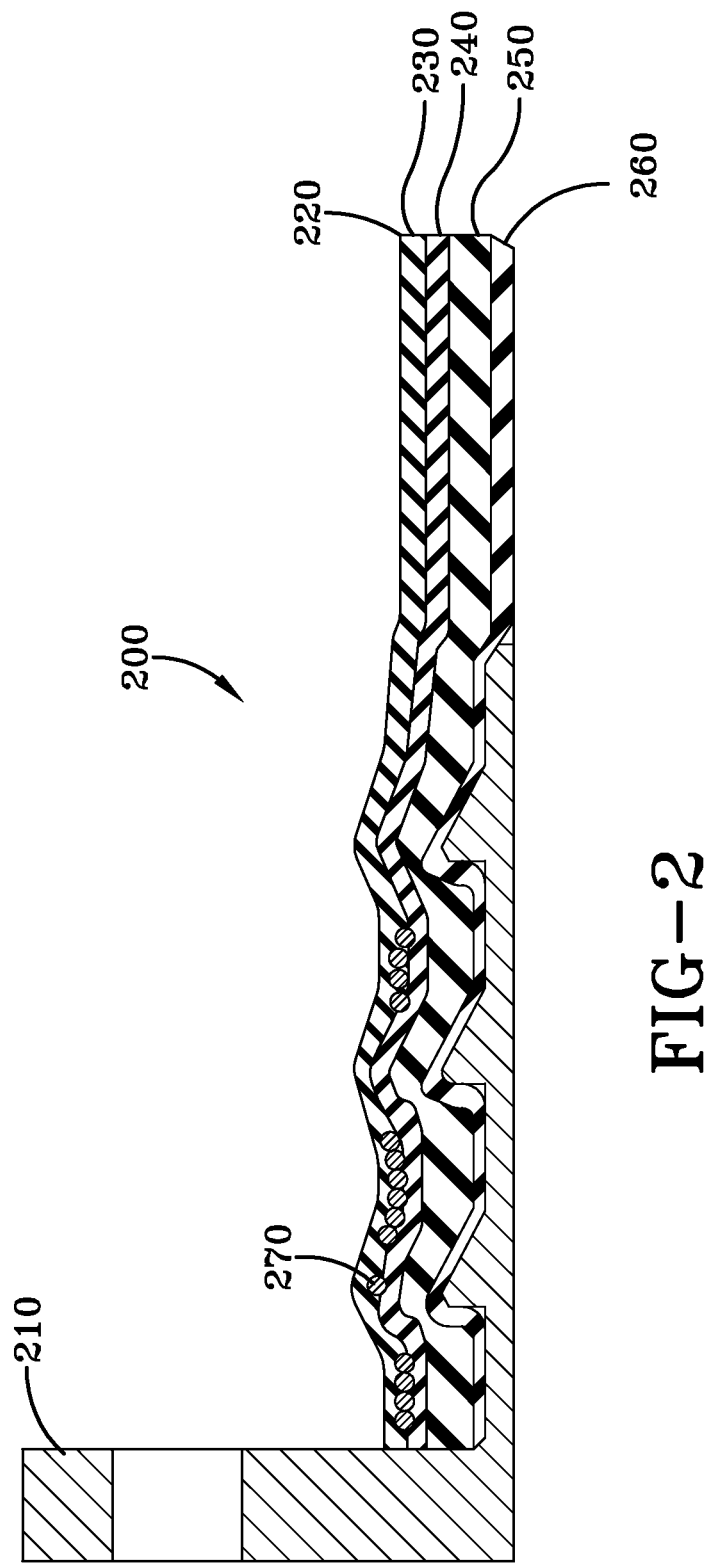
FIG. 2 is a longitudinal cross sectional view of an embodiment showing various layers and components thereof, including a nipple flange member.

Referring now to the drawings wherein the showings are for purposes of illustrating embodiments of the invention only and not for purposes of limiting the same, FIGS. 1 and 2 show embodiments of the present invention.

FIG. 1 shows an embodiment 100 having a core layer 110, a non-wire helical reinforcing layer 120, a rubber reinforcing layer 130, and a cover layer 140. The embodiment 100 also includes an optional flange member 150. In another embodiment, this invention comprises a flange disposed at one or more ends of the hose. The non-wire helical reinforcing layer further comprises a flexible helical layer 122 and a rigid helical layer 124. The flexible layer 122 and rigid layer 124 are adjacent to each other and joined to form a single continuous layer 120. Accordingly, the rigid layer 124 provides radially reinforcing stiffness to the hose article 100, while the flexible layer 122 allows the hose article 100 to bend.

FIG. 2 shows an embodiment 200 having a core layer 260, a non-wire helical reinforcing layer 250, a rubber reinforcing layer 240, a cover layer 230, and one or more steel cables 270 disposed near one end. The steel cables are adapted to secure the hose article 200 to the nipple of a nipple flange 210. In a further embodiment of this invention one or more helical reinforcing wires disposed at or near one or more ends and adapted to grip a nipple of the nipple flange.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

We claim:

1. A hose article, comprising: a core layer; a helical PVC layer comprising a flexible PVC component and a rigid PVC component over the core layer; an intermediate rubber reinforcing layer over the helical PVC layer; and a rubber cover layer over the intermediate rubber reinforcing layer; wherein the rubber cover layer is comprised of chlorinated polyethylene, wherein the flexible component defines a helix in a coaxial relation to the core layer, and the rigid component defines a helix that joins the turns of the flexible component helix and forms a continuous PVC layer comprising a flexible helix and a rigid helix, and wherein the hose article is wireless and wherein the hose article is void of braided, wound or knitted fiber layers.

2. The article of claim 1, wherein the core layer comprises thermoplastic polyurethane.

3. The article of claim 1, wherein the intermediate rubber layer comprises a material selected from the group consisting of chlorosulfonated polyethylene, chlorosulfonated polyethylene/chlorinated polyethylene blend, hydrogenated nitrile rubber, nitrile rubber, polychloroprene, chlorinated polyethylene acrylonitrile-butadiene, styrene butadiene, polyisoprene, polybutadiene, ethylene-propylene-diene terpolymers, chlorinated polyethylene, natural rubber polymers, propylene/ethylene-propylene rubber blends, or any combination thereof.

4. The article of claim 1, wherein the hose comprises an internal diameter from about 2 inches to about 12 inches.

5. The article of claim 1, further comprising a flange disposed at one or more ends of the hose.

6. The article of claim 5, wherein the flange comprises a nipple flange.

7. The article of claim 1 wherein the hose consists solely of the core layer; the helical PVC layer, the intermediate rubber reinforcing layer, and the rubber cover layer.

8. The article of claim 1 wherein the wherein the intermediate rubber layer is comprised of chlorinated polyethylene.

9. The article of claim 1 wherein the hose has an internal diameter which is within the range of 2 inches to 3 inches.

10. The article of claim 1 wherein the hose has an internal diameter which is within the range of 3 inches to 4 inches.

11. The article of claim 1 wherein the intermediate rubber layer is comprised of hydrogenated nitrile rubber.

* * * * *